United States Patent Office 3,364,176
Patented Jan. 16, 1968

3,364,176
POLYFUNCTIONAL EPOXIDES AND
THEIR POLYMERS
William De Acetis, Berkeley, and Edgar J. Smutny, San
Francisco, Calif., assignors to Shell Oil Company, New
York, N.Y., a corporation of Delaware
No Drawing. Filed May 14, 1965, Ser. No. 455,999
9 Claims. (Cl. 260—47)

This invention relates to a new class of epoxy compounds. More particularly, the invention relates to new epoxides derived from hydroxyphenyl substituted octadienes and the resin products obtained therefrom.

It is known that liquid polyepoxides derived from polyhydric phenols, such as diglycidyl ethers of 2,2-bis(4-hydroxyphenyl)propane are useful in the preparation of castings and coating compositions. The use of these materials however has been limited due to their high viscosities. It has been possible in some cases to reduce the viscosity by the addition of reactive diluents, such as n-butyl glycidyl ether, but the addition of such materials generally causes a loss in some of the desired properties of the cured system. Further, the known liquid polyepoxides derived from the polyhydric phenols are not as reactive with curing agents, such as aromatic polyamines, as would be desirable for many applications. In addition, these known polyepoxides fail to give the degree of hardness, particularly at elevated temperatures, required for many commerical applications. Further, such polyepoxides have been rather difficult and expensive to manufacture commercially.

It is an object of this invention to provide novel epoxy compounds. It is a further object of the invention to provide epoxy compounds having a plurality of polymerizable groups which may be reacted to form highly cross-linked resins having excellent hardness and resistance to chemicals. It is also an object to provide novel triepoxides which have lower viscosities than conventional polyepoxides. These and other objects will be apparent from the following description.

The novel epoxides of the invention are represented by the general formula:

(I) $\quad$ H—(CH$_2$)$_{y-n}$—(D)$_n$—CH—(D)$_m$—(CH$_2$)$_{3-y}$—D—H

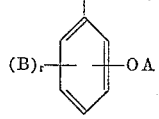

wherein each
D is independently selected from —CH=CH— and $$-\overset{O}{\overset{\diagup\phantom{x}\diagdown}{CH-CH-}}$$

A is hydrogen or an epoxy alkyl group;
B is selected from halogen, alkyl, alkoxy, haloalkyl and dialkylamino;
n is zero or 1 and m is zero or 1, the sum of n+m being 1;
y is zero or 1; and r is an integer from 0 to 2.
B is preferably selected from halogen of an atomic number between 17 and 35, alkyl of from 1 to 4 carbon atoms or alkoxy of from 1 to 4 carbon atoms. At least one of the groups A and D is an epoxy containing radical. It is to be understood that the remainder of the aromatic ring carbon atoms are hydrogen substituted.

The above-described epoxy compounds are prepared from rearrangement products of phenoxyoctadiene. Phenoxyoctadiene and particularly 1-phenoxyoctadiene-2,7 is prepared by reacting a phenol and butadiene in the presence of certain transition metal compounds such as palladium dichloride as described in copending application Ser. No. 455,965, filed May 14, 1965, the pertinent portions being incorporated herein by reference.

In the presence of certain catalysts and/or heat, the phenoxy-octadiene rearranges to form a hydroxyphenyl-octadiene of the formula (II)

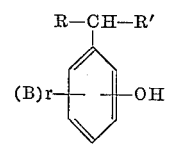

wherein R is hydrogen, —CH$_3$ or —CH=CH$_2$; R' is a diethylenically unsaturated aliphatic hydrocarbyl radical of from 5–7 carbon atoms (depending on the value of R); and B and r are set forth above. Thus, for example, when 1-phenoxyoctadiene-2,7 is heated in the presence of diethylaniline the Claisen rearrangement products 2-(2-hydroxyphenyl) - 3,7 - octadiene and 3 - (2-hydroxyphenyl)-1,7-octadiene are obtained. When the phenoxyoctadiene is heated at or about atmospheric pressure with π-allyl palladium chloride triphenylphosphine complex and sodium phenate catalyst, 1-(hydroxyphenyl)-2,7-octadiene is prepared. The above-described rearranged products of phenoxyoctadiene and the process for preparing them are believed to be novel and are the work of E. J. Smutny.

The novel epoxides of this invention are prepared by epoxidizing the hydroxyphenyloctadiene and/or reaction with an epoxy forming material.

The octadienyl group of a hydroxyphenyloctadiene may be epoxidized to convert either or both of the ethylenic groups to epoxy groups by the use of epoxidizing agents such as peracetic acid, perbenzoic acid, monoperphthalic acid, etc. The amount of agent used depends on the degree of epoxidation desired. One mole of agent per mole of phenolic octadiene is necessary to convert one ethylenic group. At least two moles of agent should be used to completely epoxidize one mole of the octadienyl compound.

It is preferred to carry out the epoxidation reaction in a suitable mutual solvent for the reactants and product. Chloroform is an especially useful solvent for this purpose, but other materials such as ethyl ether, dichloromethane, benzene, ethyl acetate, and the like, may be used. It is not necessary to operate under anhydrous conditions, but the amount of water present should be limited so as to avoid excessive hydrolysis of the epoxy groups. Up to about 25% water in the reaction mixture may be tolerated.

The temperature employed during the epoxidation may vary over a considerable range depending upon the oxidizing agent selected. It is generally desirable to maintain the temperature between 0° C. to 60° C. Atmospheric, superatmospheric or subatmospheric pressures may be employed as desired.

The epoxidized products obtained by this method may be recovered from the reaction mixture by any convenient means known to the art, such as distillation, extraction, fractional precipitation, filtration and the like.

The phenolic hydroxyl group of the hydroxyphenyloctadiene may optionally be left unreacted or it may be reacted to form a different functional group depending on the intended use and properties desired in the final epoxide or polymer thereof. Thus, for example, the phenol may be reacted with an organic halide in the presence of an alkaline medium wherein the organic group contains halogens and/or phosphorus to impart flame retardant properties to the epoxide and its polymers.

In a preferred embodiment of the invention the hydroxyphenyloctadiene is reacted with an epoxy-halo-substituted alkane thereby producing an epoxyalkoxyphenyloctadiene. The expression epoxy-halo-substituted alkane refers to alkanes having a vic-epoxy group, i.e., a

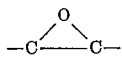

group attached directly to a halogen bearing carbon atom such as, for example, epichlorohydrin, epibromohydrin, 1,4 - dichloro - 2,3 - epoxybutane, 1 - chloro - 2,3 - epoxypentane and the like. Especially preferred are the epoxy-halo-substituted alkanes containing no more than 12 carbon atoms, and preferably from 3 to 8 carbon atoms. Epichlorohydrin comes under special consideration because of its relatively low cost, availability and reactivity. Thus, the preferred compounds of Formula I are those wherein A is an epoxy alkyl radical of from 3 to 8 carbon atoms.

The reaction between the hydroxyphenyl octadiene and halo-epoxy-substituted alkane takes place in an alkaline medium provided by the presence of basic substances such as sodium or potassium hydroxide in at least chemically equivalent amounts and preferably where the latter are present in stoichiometric excess. The preferred reaction temperatures are between about 50° C. to 150° C. and more preferably between about 80° C. and 125° C. Pressures are not critical and may be atmospheric, superatmospheric or subatmospheric. The relative proportions of the octadienyl substituted phenol and the halo-epoxy-substituted alkane are preferably 1:1 but may be between 1.5:1 and 1:1.5, respectively.

It will be appreciated that where an epoxylalkoxyphenyloctadiene is prepared, the epoxidation of the octadienyl group is optional depending on the product desired. Thus, epoxyalkoxyphenyloctadienes such as 1 - (2,3 - epoxypropoxyphenyl) - 1,7 - octadiene, 2 - (2,3 - epoxybutoxyphenyl)-3,7-octadiene, 3-(2,3-epoxypropoxyphenyl)-1,7-octadiene, etc., may be prepared. However, where the hydroxyl group of the hydroxyphenyloctadiene is not reacted or is converted to a non-glycidyl ether, at least one of the ethylenic groups of the octadienyl radical is converted to an epoxy group according to this invention.

As set forth above, the epoxides of this invention may contain ethylenically unsaturated linkages and epoxy group(s) and thus may be polymerized by reaction of either of these polymerizable groups to form valuable resin products. Polymerization through the ethylenic linkages produces linear chains of carbon atoms while polymerization through the epoxy groups forms linear chains of carbon atoms connected by intermediate oxygen atoms. It is therefore possible to form from these epoxides products which are composed of substituted ethylene groups, substituted oxyalkylene groups, or which are composed of any intermediate mixture of the two types of structural units by varying the reaction conditions to favor the polymerization of one or the other or both polymerizable groups.

Increasing the reaction temperature increases the rate of both the oxy-polymerization reaction (polymerization of the epoxide groups) and the carbo-polymerization reaction (the polymerization of the unsaturated linkages). At a given elevated temperature in the presence of acidic, basic, or neutral epoxy curing agents, the oxy-polymerization reaction predominates. In the absence of the above materials and in the presence of carbo-polymerization catalysts such as organic peroxides, perborates, persulfates, actinic light, oxygen, Ziegler catalysts, and the like, the carbo-polymerization reaction predominates.

A preferred method of producing predominately carbon-to-carbon linked polymers comprises the oxygen catalyzed polymerization of the unsaturated epoxides at temperatures between about 50° C. and 300° C. A particularly economical means of accomplishing the reaction comprises maintaining the epoxide (in the absence of the oxy-polymerization reaction catalysts mentioned above) at between about 50° to 200° C. or at the reflux temperature of the epoxide under atmospheric pressure, while aerating it with oxygen, which is most conveniently and economically introduced in the form of normal air. Where it is practical or desirable to employ higher temperatures the reaction may be conducted in greater than atmospheric pressure systems with or without continuous introduction of oxygen or other carbo-polymerization catalysts.

Alternatively, predominately carbon-to-carbon linked polymers may be produced by polymerizing the above defined epoxides at temperatures between about 50° C. and 300° C. in the presence of an organic peroxide. Diacyl or dialkyl peroxides as well as acyl or alkyl hydroperoxides, peresters, diperoxides, and the like may suitably be employed. In such employment peroxides in which the peroxide oxygen atoms are directly attached to one or more tertiary-alkyl radicals are particularly advantageous by virtue of their relative stability to impact and to the conditions of storage and handling in general. The amount of peroxide required for the polymerization reactions may be varied over relatively wide limits, but in general increasing the amount of organic peroxide above about 5% based on the weight of the epoxides becomes relatively uneconomical. Illustrative examples of organic peroxides suitable for employment in the process include, ditertiary-butyl peroxide, ditertiary-amyl peroxide, tertiary-butyl tertiary-amyl peroxide, tertiary-butyl hydroperoxide, benzoyl peroxide, 2,2'-bis (tertiary - butyl - peroxy)propane, tertiary - amyl hydroperoxide, acetyl peroxide, acetone peroxide, methyl n-propyl butane peroxide, dicyclohexyl peroxide and the like.

The polymers prepared in the above manner in the presence of the carbo-polymerization catalysts and in the absence of the oxy-polymerization catalysts have a relatively high solubility and are fusible. These properties may be greatly modified by the application of conditions favoring oxy-polymerization either during the polymerization reaction or before or after applying, or molding the composition for its desired application.

In polymerizing through the ethylenic linkages as set forth above, in order that the resulting polymers will contain as many unchanged epoxy groups as possible, it is essential that the ether be polymerized in the presence of an oxygen-yielding peroxy catalyst that is non-acid engendering since liberated acid may react with epoxy groups. Reference is made to preferred use of such catalysts as tertiary alkyl hydroperoxides such as tertiary butyl hydroperoxide, di(tertiaryalkyl)peroxides such as di(tertiarybutyl)peroxide and the like. About 0.1 to 10% by weight of the peroxides are used in effecting polymerization therewith. These epoxy containing polymers may then be cured to form hard, infusible resins by cross-linking of the molecules through the reactive epoxy groups.

It is a special embodiment of the invention to provide novel triepoxides of the formula

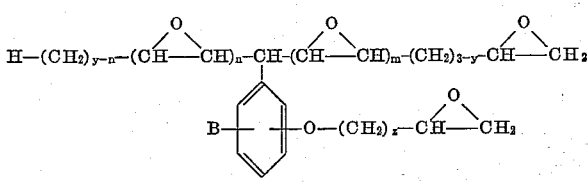

wherein z is an integer of from 1 to 6 and B, m, n, x and y are as set forth above. Preferred triepoxides are 1-(2,3-epoxypropoxyphenyl)2,3,7,8 - diepoxyoctane, 2-(2,3-epoxypropoxyphenyl)3,4,7,8-diepoxyoctane and 3-(2,3-epoxypropoxyphenyl)1,2,7,8-diepoxyoctane.

These novel triepoxides by virtue of their structure possess desirable properties whereby they may be reacted through their epoxy groups to form valuable resin products which are extremely hard and have excellent heat resistance. These properties are undoubtedly due to the presence of the polyepoxy hydrocarbyl radical which is directly attached to the aromatic ring rather than by the usual oxygen ether linkages as is present in the well known polyglycidyl ethers such as the polyepoxides prepared by reacting epichlorohydrin and a polyhydric phenol. The novel triepoxides of the invention by virtue of their plurality of vic-epoxyhydrocarbyl radicals have high functionality without a corresponding undue increase in molecular weight thereby providing polyepoxides having relatively low molecular weights and viscosities. It has been found for example, that the novel triepoxides may be used without the addition of diluents owing to their low viscosities.

The epoxy containing monomers or ethylenically polymerized polymers as set forth above may be cross-linked or cured in the presence of the well known epoxy curing agents to form highly cross-linked resins which because of their hardness and resistance to chemical attack may be used for a variety of purposes. Typical epoxy curing agents which may be used include, among others, carboxylic acids or anhydrides, such as phthalic anhydride, tetrahydrophthalic anhydride, Nadic methyl anhydride, chlorendic anhydride, pyromellitic anhydride, trimellitic anhydride, succinic anhydride, maleic anhydride, octadecenylsuccinic anhydride, etc. and mixtures thereof; dimer or trimer acids derived from unsaturated fatty acids such as 1,20-eicosanedioic acid; Friedel-Crafts metal halides such as, for example, aluminum chloride, zinc chloride, ferric chloride, boron trifluoride as well as mixtures thereof with ethers, acid anhydrides, ketones diazonium salts, and those disclosed in U.S. 2,842,083; salts such as zinc fluoborate, magnesium perchlorate, zinc fluosilicate; phosphoric acid and partial esters thereof including n-butyl orthophosphate, diethyl ortho-phosphate, hexaethyltetraphosphate, etc.; aliphatic, cycloaliphatic, aromatic and heterocyclic amines such as diethylene triamine, triethylene tetramine, tetraethylene pentamine, dicyandiamide, melamine, pyridine, cyclohexylamine benzyldimethylamine, benzylamine, diethylaniline, triethanolamine, piperidine, tetramethylpiperazine, N,N-dibutyl-1,3-propane diamine, 1,2-diamino-2-methylpropane, dibutylamine dioctylamine distearylamine, diallylamine, pyrrolidine, tetrahydropyridine, ortho, meta and para-phenylene diamine, diaminodiphenylmethane, p,p'-aminodiphenylsulfone, triaminobenzene, methylene dianiline, diaminotoluene, diaminodiphenyl, diamino stilbene, 1,3-diamino-4-isopropyl benzene, benzenetriamine, and soluble adducts of amines and polyexpoxides and their salts as described in U.S. 2,651,589 and U.S. 2,640,037 and amino-amides obtained by reacting polybasic acids with polyamines as described in U.S. 2,450,940 and 2,695,908.

Preferred curing agents are the polycarboxylic acids and their anhydrides, the primary and secondary amines and polyamines and their epoxide adducts.

The particular amount of curing agent used is dependent on the nature of the curing agent. More specifically the tertiary amines and BF₃ complexes are preferably employed in amounts of from about 0.5% to 20% and the metal salts are preferably employed in amounts of from about 1% to 15%. The primary and secondary amines, acids and anhydrides are preferably employed in an amount sufficient to provide from 0.6:1 to 1.5:1 amino hydrogens, carboxyl or anhydride group for each epoxy group to be cured. Where anhydride curing agents are used, it is often desirable to add a small amount of promoter to hasten the cure (0.1–5% by weight of the total composition). Suitable promoters include tertiaryamines such as benzyldimethylamine, octoates such as stannous and zinc octoate, alkyl sulfides, phosphines such as triphenylphosphine, quaternary ammonium salts, etc.

The cure of the epoxides is preferably effected by mixing curing agent with the epoxide and heating. Curing temperatures range generally from room temperature to about 200° C., the exact range depending on the curing agent selected. Active curing agents, such as the aliphatic amines may be utilized, for example, at lower temperatures, such as from room temperature to about 60° C. Less active materials, such as polybasic anhydrides and acids, generally require higher temperatures, such as temperatures ranging from about 60° C., to 150° C. Aromatic amines are preferably employed at the higher temperatures, e.g., temperatures ranging from 60° C. to 150° C.

In addition to resin products formed by curing the epoxides of this invention as set forth above, mixtures of the latter with a variety of other polyepoxides may be cured with the above described curing agents to form valuable copolymeric resins. Examples of polyepoxides which may be co-cured with these epoxides include poly-(epoxyhydrocarbyl)benzene-substituted epoxides disclosed in U.S. 2,965,607, glycidyl polyethers of polyhydric phenols obtained by reacting polyhydric phenols, such as bisphenol, resorcinol, and the like, with an excess of chlorohydrin, such as epichlorohydrin, polyepoxide polyethers obtained by reacting an alkane polyol, such as glycerol and sorbitol, with epichlorohydrin and dehydrohalegenating the resulting product, polymers prepared from ethylenically unsaturated epoxides, such as allyl glycidyl ether, alone or with other ethylenically unsaturated monomers, and polyepoxide polyethers obtained by reacting a polyhydric alcohol or polyhydric phenol with any of the above described polyepoxides.

The cured epoxide compositions may be used in the preparation of coating compositions, foams, pottings, castings, adhesives, impregnating compositions and the like by methods known to those skilled in the art. In such applications other materials such as drying oils, coloring agents, fillers, preservatives, etc. may be added to the resin composition to obtain the desired products.

The following examples are provided to illustrate the manner in which the invention is carried out. It is to be understood that the examples are given for the purpose of illustration only and the invention is not to be regarded as limited to any of the specific compounds or conditions recited therein. Unless otherwise indicated, parts disclosed in the examples are given by weight.

*Example I*

Phenoxyoctadiene (50 ml.) and aluminum triethyl were slowly mixed in a stainless steel autoclave with cooling and under a dry nitrogen atmosphere. The autoclave was placed in a constant temperature oven at 110° C. for 6 hours. The autoclave was then cooled, the pressure released and the contents hydrolyzed at −70° C. with methanol and then at room temperature with 1:1 aqueous HCl. The alcohol and HCl were removed under vacuum and the product isolated at reduced pressure. The product was analyzed to be 3-(2-hydroxyphenyl)-1,7-octadiene.

Into a 200 ml. flask was placed 20.2 grams of the 3-(2-hydroxyphenyl)-1,7-octadiene, 28 grams of epichlorohydrin and 5 ml. of water. The temperature of the reaction mixture was brought to 101° C. and a 5 ml. aqueous solution containing 4.08 g. sodium hydroxide was added dropwise with stirring with the excess water being removed by distillation. After the addition of caustic was complete the mixture was allowed to reflux until the temperature was about 120° C. after which time it was cooled to 25° C. Chloroform (200 ml.) was then added to the reaction mixture and the solution washed with 25 ml. portions of water until neutral. Excess water and epichlorohydrin and chloroform were then removed with the resulting product being a yellowish liquid having an epoxide value of 0.309 equivalent per 100 grams. The product was 3-[2-(2,3-epoxypropoxyphenyl)]-1,7-octadiene.

*Example II*

The 3-(2,3-epoxypropoxyphenyl)-1,7-octadiene (21.7 g.) prepared above and 150 ml. chloroform was placed in a reaction flask and cooled to 5° C. To this mixture was added a solution of 30 g. peracetic acid and 0.8 g. sodium acetate dropwise over about 30 minutes and the reaction was allowed to continue for about 16 hours with constant stirring, the 5° C. temperature being maintained throughout. The mixture was allowed to warm to room temperature and was then stirred for about 25 hours after which time the reaction was quenched by the addition of 200 ml. water and the resulting two phases separated. The organic layer was washed free of acid with water, dried over anhydrous MgSO$_4$, filtered and dried in a vacuum. A light yellowish liquid was obtained having an epoxy value of 0.84 equivalent per 100 grams and identified as 3-[2-(2,3-epoxypropoxyphenyl)]-1,2,7,8-diepoxy octane. This product was observed to be significantly less viscous than EPON 828.

*Example III*

The triepoxide prepared in Example II (5.0 g.) was mixed with 1.13 g. of m-phenylenediamine which mixture was heated for 1 hour at 80° C. followed by 4 hours at 150° C. The hardness of the resulting castings at various temperatures is shown below:

| Degrees C.: | Barcol hardness |
| --- | --- |
| 25 | 50 |
| 60 | 36 |
| 80 | 33 |
| 100 | 31 |
| 120 | 20 |

*Example IV*

1-phenoxyoctadiene-2,7 (20 g.) was dissolved in 60 g. of diethylaniline and heated to reflux for 12 hours. The solvent was removed and the product distilled at reduced pressure. The product was 2-(2-hydroxyphenyl)-3,7-octadiene which is converted to 2-[2-(2,3-epoxypropoxyphenyl)]-3,7-octadiene and 2-[2-(2,3-epoxypropoxyphenyl)]-3,4,7,8-diepoxyoctane by the procedures of Examples I and II above, respectively. The cured polymers of these epoxides are prepared as set forth in Example III.

*Example V*

1-phenoxyoctadiene-2,7 (0.05 moles) was heated to 160° C. in the presence of a mixture of 0.29 grams of π-allyl palladium chloride triphenyl phosphine and 0.15 gram of sodium phenoxide at atmospheric pressure. The reaction product was a mixture of 1-(2-hydroxyphenyl)-2,7 - octadiene and 1-(4-hydroxyphenyl)-2,7-octadiene. These compounds are then converted to 1-[2-(2,3-epoxypropoxyphenyl)]-2,7-octadiene by the method of Example I which is in turn converted to 1-[2-(2,3-epoxypropoxyphenyl)]-2,3,7,8-diepoxyoctane by the method of Example II. The triepoxide is cured as set forth in Example III.

We claim as our invention:
1. A compound of the formula

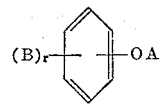

wherein
  each D is selected from the group consisting of
$$-CH=CH-$$
and
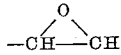

A is an epoxy alkyl of from 3 to 8 carbon atoms,
B is selected from the group consisting of halogen, alkyl, alkoxy, haloalkyl and dialkylamine,
m, n and y are integers independently selected from 0 and 1, the sum of m+n being 1, and r is an integer between 0 and 3.

2. A tetraepoxide of the formula

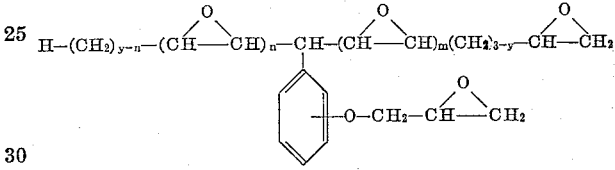

wherein m, n and y are integers independently selected from 0 and 1, the sum of m+n being 1.

3. 1-[2-(2,3-epoxypropoxyphenyl)]-2,7-octadiene.
4. 2-[2-(2,3-epoxypropoxyphenyl)]-3,7-octadiene.
5. 3-[2-(2,3-epoxypropoxyphenyl)]-1,7-octadiene.
6. 1 - [2 - (2,3-epoxypropoxyphenyl)]-2,3,7,8-diepoxyoctane.
7. 2 - [2 - (2,3-epoxypropoxyphenyl)]-3,4,7,8-diepoxyoctane.
8. 3 - [2 - (2,3-epoxypropoxyphenyl)]-1,2,7,8-diepoxyoctane.
9. A product obtained by reacting a compound of claim 2 with an epoxy resin curing agent.

No references cited.

WILLIAM H. SHORT, *Primary Examiner.*

T. D. KERWIN, *Assistant Examiner.*